(12) United States Patent
Osawa et al.

(10) Patent No.: US 11,881,968 B2
(45) Date of Patent: Jan. 23, 2024

(54) USER TERMINAL AND RADIO COMMUNICATION METHOD

(71) Applicant: NTT DOCOMO, INC., Tokyo (JP)

(72) Inventors: Ryosuke Osawa, Tokyo (JP); Yuichi Kakishima, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/958,510

(22) PCT Filed: Dec. 27, 2017

(86) PCT No.: PCT/JP2017/047058
§ 371 (c)(1),
(2) Date: Jun. 26, 2020

(87) PCT Pub. No.: WO2019/130506
PCT Pub. Date: Jul. 4, 2019

(65) Prior Publication Data
US 2021/0058274 A1    Feb. 25, 2021

(51) Int. Cl.
*H04L 25/02* (2006.01)
*H04B 7/0456* (2017.01)
*H04L 5/00* (2006.01)

(52) U.S. Cl.
CPC ....... *H04L 25/0226* (2013.01); *H04B 7/0482* (2013.01); *H04L 5/0051* (2013.01)

(58) Field of Classification Search
CPC .. H04L 25/0226; H04L 5/0051; H04B 7/0482
See application file for complete search history.

(56) References Cited

U.S. PATENT DOCUMENTS

| | | | |
|---|---|---|---|
| 2015/0280850 A1* | 10/2015 | Liu | H04B 7/0456 370/335 |
| 2016/0242182 A1* | 8/2016 | Chen | H04W 72/0453 |
| 2019/0174527 A1* | 6/2019 | Park | H04L 5/0048 |
| 2020/0162133 A1* | 5/2020 | Harrison | H04B 7/0486 |
| 2020/0322816 A1* | 10/2020 | Xu | H04W 24/02 |
| 2020/0366429 A1* | 11/2020 | Huang | H04B 7/0632 |

OTHER PUBLICATIONS

U.S. Appl. No. 62/521,028, Multi-Resource Uplink Sounding and Antenna Subset Transmission; Jun. 16, 2017; pp. 12-17, 20-21, 24.*
Ericsson, "UL MIMO procedures for codebook based transmission," 3GPP TSG-RAN WG1 #89ah-NR, R1-1711008; Qingdao, China, Jun. 27-30, 2017, 8 pages.*

(Continued)

*Primary Examiner* — Jackie Zuniga Abad
(74) *Attorney, Agent, or Firm* — Osha Bergman Watanabe & Burton LLP

(57) ABSTRACT

A user terminal according to one aspect of the present disclosure includes: a transmitting section that transmits an uplink shared channel by applying a precoder; and a control section that specifies a number of ports used to determine the precoder when a Sounding Reference Signal (SRS) resource is not configured. According to one aspect of the present disclosure, even when an SRS resource is not configured, it is possible to appropriately determine a precoder of a UL signal.

5 Claims, 10 Drawing Sheets

(56) References Cited

OTHER PUBLICATIONS

International Search Report issued in PCT/JP2017/047058 dated Feb. 27, 2018 (2 pages).
Written Opinion of the International Searching Authority issued in PCT/JP2017/047058 dated Feb. 27, 2018 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
3GPP TSG RAN WG1 Meeting #90; R1-1713911 "Beam determination for non-codebook based transmission for uplink" NTT DOCOMO, Inc.; Prague, Czech Republic; Aug. 21-25, 2017 (3 pages).
3GPP TSG RAN WG1 NR Ad-Hoc Meeting; R1-1711074 "Beam determination for non-codebook based transmission for uplink" NTT DOCOMO, Inc.; Qingdao, China; Jun. 16-20, 2017 (3 pages).
3GPP TSG RAN1 #89; R1-1709376 "WF on SRS Txbeam determination" LG Electronics, Intel Corporation; Hangzhou, P.R. China; May 15-19, 2017 (4 pages).
Extended European Search Report issued in European Application No. 17935913.8, dated Jun. 21, 2021 (7 pages).
Office Action issued in the counterpart Chinese Patent Application No. 201780098285.9, dated May 13, 2023 (12 pages).

* cited by examiner

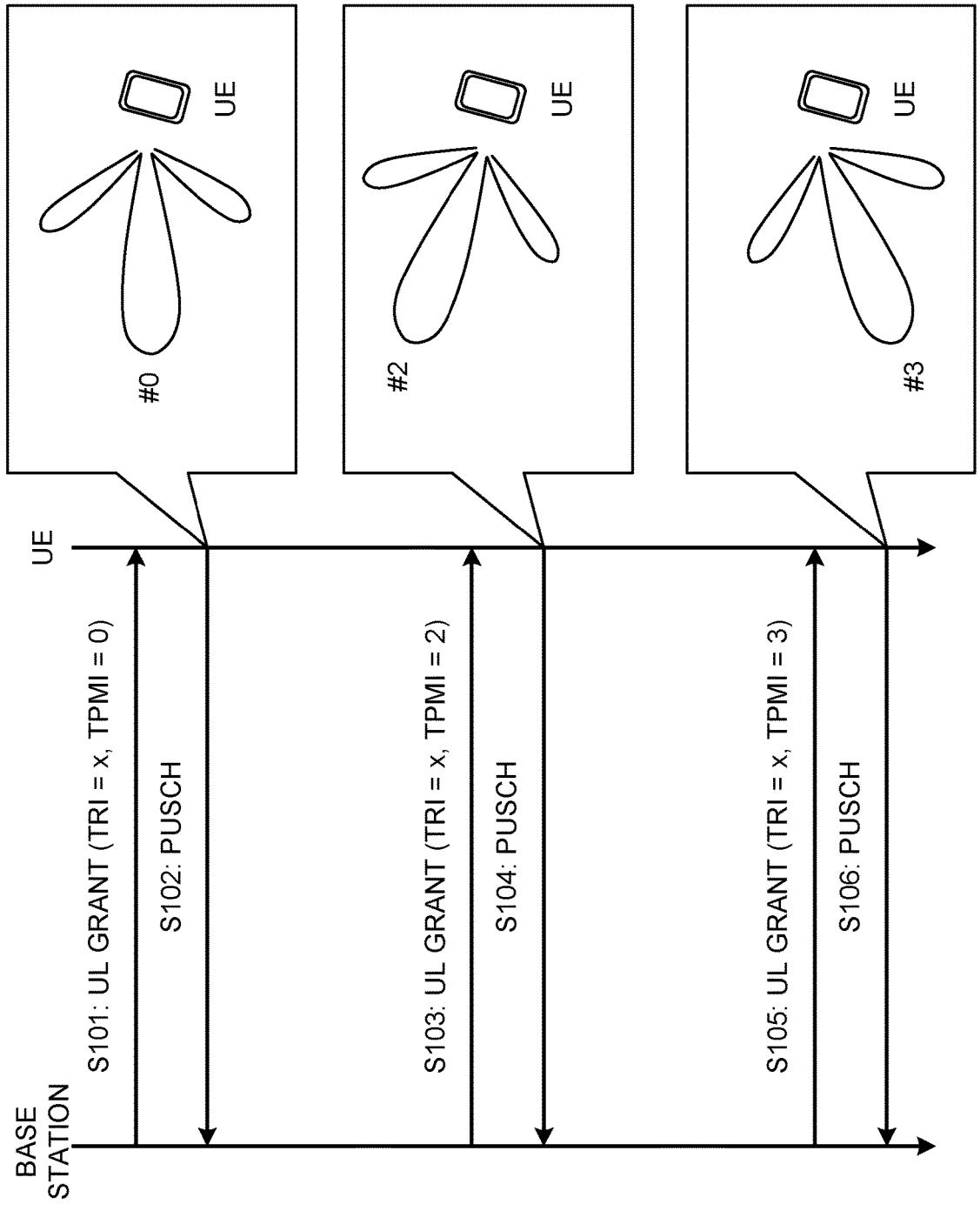

USER TERMINAL AND RADIO COMMUNICATION METHOD

TECHNICAL FIELD

The present disclosure relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for a larger capacity and higher sophistication than those of LTE (LTE Rel. 8 and 9), LTE-Advanced (LTE-A and LTE Rel. 10, 11, 12 and 13) has been specified.

LTE successor systems (also referred to as, for example, Future Radio Access (FRA), the 5th generation mobile communication system (5G), 5G+(plus), New Radio (NR), New radio access (NX), Future generation radio access (FX) or LTE Rel. 14, 15 or subsequent releases) have been also studied.

According to legacy LTE (e.g., LTE Rel. 13), a user terminal (UE: User Equipment) transmits a Sounding Reference Signal (SRS) to measure an uplink channel.

Furthermore, a base station (e.g., eNodeB (eNB)) transmits a downlink control channel (UL grant) for instructing scheduling of UL data (uplink shared channel (PUSCH: Physical Uplink Shared Channel)), and the UE transmits the UL data according to the UL grant.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It has been studied that, in a future radio communication system (e.g., NR), a UE decides a precoder for PUSCH transmission based on at least an SRS Resource Index (SRI).

The study made so far has shown that, according to NR, the UE cannot decide the number of ports used to determine a precoder for PUSCH transmission unless an SRS resource is configured, and cannot appropriately perform multi-layer PUSCH transmission. However, configuring an SRS resource to the UE at all times causes lack of UL resources. As a result, there is a risk that a system throughput lowers.

It is therefore one of objects of the present disclosure to provide a user terminal and a radio communication method that can appropriately determine a precoder of a UL signal even when an SRS resource is not configured.

Solution to Problem

A user terminal according to one aspect of the present disclosure includes: a transmitting section that transmits an uplink shared channel by applying a precoder; and a control section that specifies a number of ports used to determine the precoder when a Sounding Reference Signal (SRS) resource is not configured.

Advantageous Effects of Invention

According to the present disclosure, it is possible to appropriately determine a precoder of a UL signal even when an SRS resource is not configured.

BRIEF DESCRIPTION OF DRAWINGS

FIG. 2 is a diagram illustrating one example of a sequence in a case where PUSCH transmission based on open loop MIMO is performed according to one embodiment.

DESCRIPTION OF EMBODIMENTS

It has been studied for NR that a UE supports codebook-based transmission and non-codebook-based transmission. It has been studied that the UE decides for each transmission a precoder for PUSCH transmission by using at least an SRS Resource Index (SRI).

For example, in a case of the codebook-based transmission, the UE may determine the precoder for PUSCH transmission based on an SRI, a Transmitted Rank Indicator (TRI), and a Transmitted Precoding Matrix Indicator (TPMI). In a case of the non-codebook-based transmission, the UE may determine the precoder for PUSCH transmission based on the SRI.

Figure 1A:
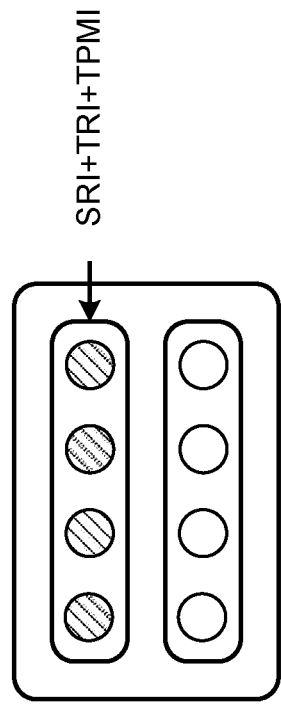
FIGS. 1A to 1D are schematic diagrams of codebook-based transmission.
Figure 1B:
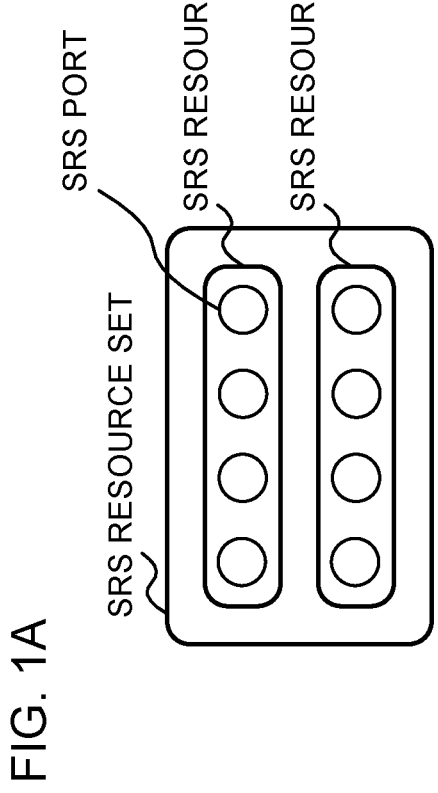

FIGS. 1A to 1D are schematic diagrams of codebook-based transmission. FIGS. 1A and 1B illustrate examples of a case where a plurality of SRS resources are configured. The UE may configure an SRS resource set of a given number of (2 in this case) SRS resources. In the case in FIG. 1A, SRS resources #0 and #1 are each configured to include four SRS ports. In this regard, the number of SRS ports is not limited to 4.

The SRS resource may be specified based on at least one of pieces of information such as an SRS resource position (e.g., time and/or frequency resource positions, a resource offset, a resource periodicity, the number of SRS symbols, an SRS bandwidth, Comb and a sequence ID), the number of SRS ports, an SRS port number, and an SRS resource number (that may be referred to as an SRS resource configuration ID (SRS-ResourceConfigId)).

Information related to the SRS resource set and/or the SRS resources may be configured to the UE by using a higher layer signaling. In this regard, the higher layer signaling may be, for example, one of a Radio Resource Control (RRC) signaling, a Medium Access Control (MAC) signaling and broadcast information or a combination of these.

The MAC signaling may be, for example, an MAC Control Element (MAC CE) or an MAC Protocol Data Unit (PDU). The broadcast information may be, for example, a Master Information Block (MIB), a System Information Block (SIB), or Remaining Minimum System Information (RMSI).

The UE may be notified of information related to at least one of the SRI, the TRI and the TPMI by a base station by using the higher layer signaling, the physical layer signaling (e.g., Downlink Control Information (DCI)) or a combination of these signalings. The information may be included in DCI (that may be referred to as a UL grant) for scheduling PUSCH transmission.

For example, the UE may select one SRS resource from the configured SRS resources based on the SRI included in the received DCI. The UE may determine a preferable precoder for an SRS port in the selected SRS resource based on the TPMI included in the received DCI. The UE may determine the number of ports used for transmission from SRS ports in the selected SRS resource based on the TRI included in the received DCI.

FIG. 1B illustrates the example of the case where the SRS resource set in FIG. 1A is configured, and the SRS resource #0 is further indicated by DCI. In this case, the UE uses the SRS port of the SRS resource #0 to determine a codebook and/or a precoder by using the TPMI and the TRI, and transmit a PUSCH by using the codebook and/or the precoder.

Figure 1C:
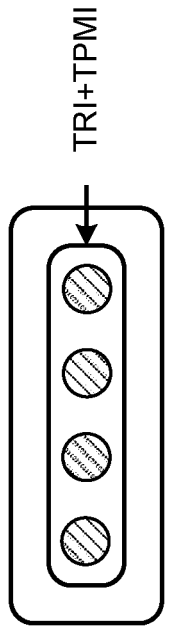
Figure 1D:
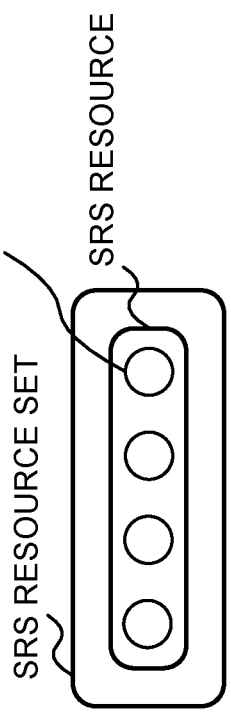

FIGS. 1C and 1D illustrate examples of a case where only one SRS resource is configured. An SRS resource set of the SRS resource may be configured to the UE. In the case in FIG. 1C, the SRS resource is configured to include four SRS ports.

FIG. 1D illustrates the example of the case where the SRS resource set in FIG. 1C is configured. In this case, the UE can uniquely specify the SRS resource, and therefore does not need to be notified of an SRI. On the other hand, the TPMI and the TRI are preferably notified to the UE. The UE uses an SRS port of the configured SRS resource to determine a codebook and/or a precoder by using the TPMI and the TRI, and transmit a PUSCH by using the codebook and/or the precoder.

In this regard, the precoder is preferably selected from a codebook (or a codebook subset) for UL. The UE may determine the codebook subset based on a parameter (UL-CodebookSubset) and/or the TPMI configured by a higher layer signaling. The UE may decide a maximum transmitted rank (the number of layers) based on a parameter (UL-maxRank) configured by the higher layer signaling.

According to the above-described PUSCH transmission method, unless an SRS resource is configured, the UE cannot decide the number of ports used to determine a precoder for PUSCH transmission, and cannot appropriately perform multi-layer PUSCH transmission. However, configuring an SRS resource to the UE at all times causes lack of UL resources. As a result, there is a risk that a system throughput lowers.

Hence, the inventors of this application have conceived a method for specifying the number of ports used to determine a precoder for PUSCH transmission even when an SRS resource is not configured.

An embodiment according to the present disclosure will be described in detail below with reference to the drawings. A radio communication method according to each embodiment may be each applied alone or may be applied in combination.

In addition, a "PUSCH" described in this description may be read as a "specific channel" or a "specific signal".

(Radio Communication Method)

According to one embodiment, when an SRS resource is not configured, the UE may assume the number of ports to be applied to PUSCH transmission (the number of ports used to determine a precoder for PUSCH transmission) as at least one of following (1) to (8), or may determine the number of ports based on at least one of following (1) to (8).

(1) The number of ports of a given reference signal (e.g., a DeModulation Reference Signal (DMRS) or a Phase-Tracking Reference Signal (PT-RS)), (2) A maximum number of SRS ports that is notified as UE capability information, (3) A maximum PUSCH rank (the number of layers) that is notified as the UE capability information, (4) The number of ports of a codebook that is indicated by a higher layer signaling (e.g., a ULCodebookSubset parameter of an RRC signaling), (5) A maximum rank (the number of layers) that is indicated by the higher layer signaling (e.g., a ULmaxRank parameter of the RRC signaling), (6) A minimum value among at least two of above (1) to (5), (7) A specific value (e.g., a TRI value) that is indicated by one of the higher layer signaling (e.g., RMSI, RRC or MAC) and a physical layer signaling (e.g., DCI) or a combination of these signalings, and (8) A value (e.g., a value of X in a case of TRI=X (X=1) at all times) that is defined by a specification.

The UE can determine the number of ports to be applied to PUSCH transmission without depending on the number of SRS ports. According to above (1), it is possible to specify the number of PUSCH ports based on the number of other RS ports. According to above (2) and (3), the UE can specify the number of PUSCH ports based on capability of the UE. According to above (4) and (5), the UE can specify the number of PUSCH ports based on another higher layer parameter. According to above (7), when, for example, the TRI and the number of DMRS ports are independent, the UE can specify the number of PUSCH ports based on the TRI.

[Open Loop MIMO (Multi-Input Multi-Output)]

FIG. 2 is a diagram illustrating one example of a sequence in a case where PUSCH transmission based on open loop MIMO is performed according to the one embodiment. This example assumes, as open loop MIMO, precoder cycling where the UE obtains a diversity gain by using a TPMI to be notified at random, yet is not limited to this.

For example, open loop MIMO may be realized by using Cyclic Delay Diversity (CDD), Space Frequency Transmit Diversity (SFTD), Space Time Transmit Diversity (STTD), Frequency Switched Transmit Diversity (FSTD), or antenna port switching.

In FIG. 2, the UE transmits a PUSCH in each of steps S102, S104 and S106 based on a UL grant transmitted from the base station to the UE in steps S101, S103 and S105. In this regard, a TRI included in each UL grant may be any value. Furthermore, a TPMI included in each UL grant is given at random by precoder cycling.

The UE uses the number of ports determined based on at least one of above-described (1) to (8) to determine a precoder and/or a codebook for each PUSCH transmission.

[Closed Loop MIMO]

Figure 3:
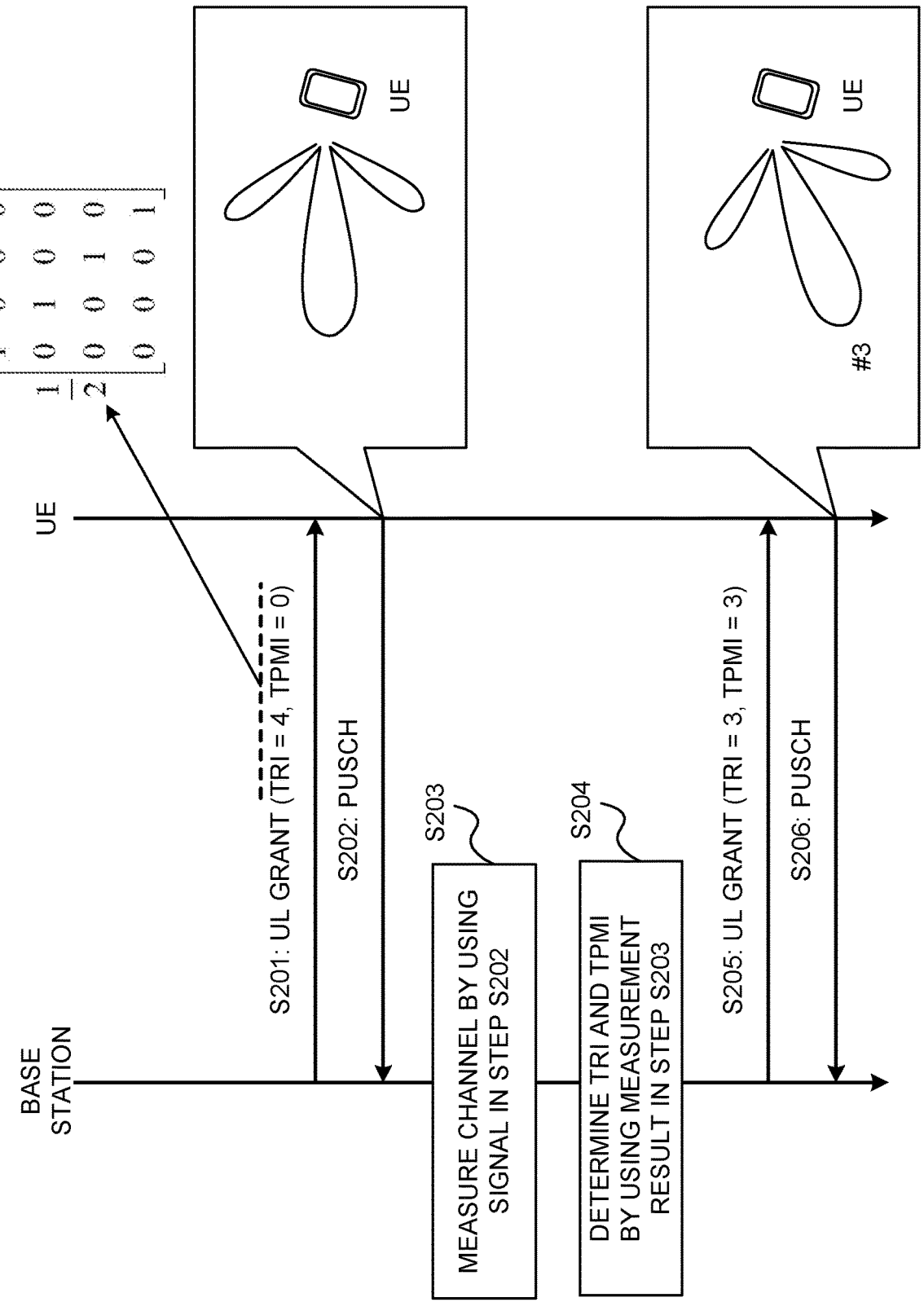
FIG. 3 is a diagram illustrating one example of a sequence in a case where PUSCH transmission based on closed loop MIMO is performed according to the one embodiment.

FIG. 3 is a diagram illustrating one example of a sequence in a case where PUSCH transmission based on closed loop MIMO is performed according to the one embodiment. In FIG. 3, the UE transmits a PUSCH in each of steps S202 and S206 based on a UL grant transmitted from the base station to the UE in steps S201 and S205.

When an SRS is not used as in the present embodiment, the base station cannot easily obtain a feedback related to a UL channel at a timing prior to first transmission (including second and subsequent transmissions, too, after TRI=1 holds once) of a PUSCH whose TRI is larger than 1. Therefore, the base station cannot notify an appropriate TRI and TPMI for first transmission of the PUSCH of TRI>1.

Hence, the base station may perform control to measure UL channel quality based on a signal other than an SRS. In step S201, the base station transmits a UL grant to cause transmission of a signal for measuring the UL channel quality before transmission of the PUSCH of TRI>1. In step S202, the UE transmits a signal to which a given precoder has been applied, based on the UL grant in step S201.

A signal transmitted for channel measurement in step S202 may be a DMRS, or may be another signal (e.g., PT-RS) other than the SRS. Antenna ports of the signal transmitted for measurement of the channel only need to be respectively orthogonal.

The above given precoder may be a diagonal matrix. In addition, components of the diagonal matrix are not limited to values illustrated in FIG. 3. The above given precoder may be selected from a given codebook (or codebook subset), may be determined based on a notification (e.g., an RRC signaling or a physical layer signaling (that may be the UL grant in step S201) from the base station, or may be defined by the specification.

The UL grant in step S201 may include the TRI and/or the TPMI to be applied to transmission in step S202 (in this example, the UL grant includes TRI=4 and TPMI=0), or may not include the TRI and/or the TPMI (i.e., fields for the TRI and/or the TPMI may be omitted).

In addition, the UE may ignore the TRI and/or the TPMI included in the UL grant in step S201. For example, the UE may use the TRI and/or the TPMI specified in advance for channel measurement.

When the UL grant in step S201 does not include the TRI and/or the TPMI, the UE may decide for transmission in step S202 a precoder assuming a number of layers larger than 1 (TRI>1). For example, the UE may decide for the transmission a precoder assuming that the TRI is a maximum number of layers of a PUSCH. The UE may assume TPMI=fixed for the transmission.

In addition, in step S202, the PUSCH may be transmitted in addition to the signal for channel measurement, or the PUSCH may not be transmitted. When the PUSCH is not transmitted, resource allocation fields of the UL grant in step S201 may be omitted.

Furthermore, the UL grant in step S201 may include a field that explicitly indicates that the UL grant triggers a signal for UL channel quality measurement. When a combination of values of the TRI and the TPMI included in the UL grant or a value obtained by joint-encoding these values is a specific value, the UE may decide that the UL grant triggers the signal for UL channel quality measurement. Furthermore, the UL grant in step S201 may be read as DCI other than the UL grant.

In step S203, the base station measures a channel by using the signal in step S202. In step S204, the base station determines the TRI and/or the TPMI by using a measurement result in step S203.

When the base station schedules a PUSCH of TRI>1 in or after step S204, the TRI and/or the TPMI (TRI=3 and TRMI=3 in this example) determined in step S204 is notified by using the UL grant (step S205). In step S206, the UE performs PUSCH transmission by using an appropriate TRI and/or TPMI based on the UL grant.

According to the above-described embodiment, even when an SRS resource is not configured, the UE can specify the number of ports used to determine a precoder for PUSCH transmission. Furthermore, for example, a DMRS can be used instead of an SRS, so that it is possible to reduce UL resources.

Modified Example

Figure 4:
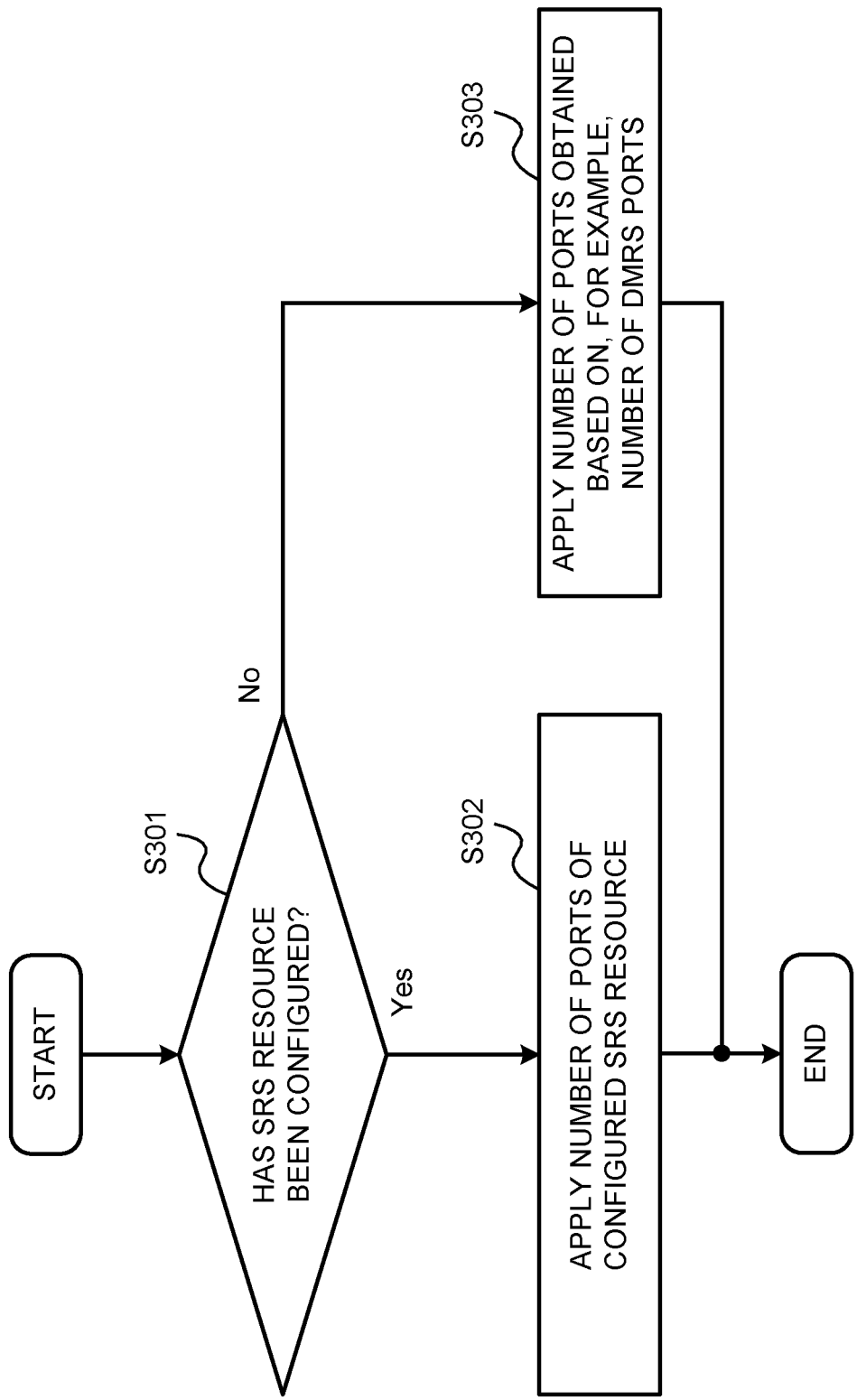
FIG. 4 illustrates one example of a flowchart for deciding the number of ports to be applied to PUSCH transmission.

The above-described embodiment has been described assuming that an SRS resource is not configured to a UE. However, there may be a case where the SRS resource is configured. FIG. 4 illustrates one example of a flowchart for deciding the number of ports to be applied to PUSCH transmission. In step S301, the UE checks whether or not an SRS resource has been configured by a base station.

In a case where the SRS resource has already been configured (step S301—Yes), the UE uses the number of ports of the configured SRS resource to specify a precoder for PUSCH transmission (step S302).

In addition, even in a case where the SRS resource has already been configured, the SRS resource may not be triggered. Unless information (that may be referred to as an Aperiodic SRS (A-SRS) trigger) for triggering the SRS resource is indicated by a higher layer signaling (such as MAC CE), a physical layer signaling (such as DCI) or a combination of these signalings, the UE may not transmit an SRS by using the SRS resource.

Furthermore, even in a case where the SRS resource has been configured, the UE may assume that the configuration of the SRS resource is used to specify the number of SRS ports, and an SRS resource is not (or cannot be) triggered.

On the other hand, in a case where the SRS resource is not configured (step S301-No), the UE uses the number of ports such as the number of DMRS ports determined based on at least one of above-described (1) to (8) to specify the precoder for PUSCH transmission (step S303).

In addition, in a case where the SRS resource is not configured, the UE may assume that the number of ports used to specify the precoder for PUSCH transmission is a given number (e.g., 4) or less.

By preferentially using the number of SRS ports if the number of SRS ports is available when the number of ports for a precoder for PUSCH transmission is specified as described in the flowchart in FIG. 4, it is possible to use a definite number of ports in a case where an SRS resource is configured.

In addition, in a case where the SRS resource is configured contrary to the example in FIG. 4, the number of ports determined based on at least one of above-described (1) to (8) may be used to specify the precoder for PUSCH transmission.

Furthermore, a priority may be specified between the number of SRS ports and the number of ports determined based on at least one of above-described (1) to (8). The UE may use the available number of ports of the highest priority as the number of ports used to specify the precoder for PUSCH transmission.

The above-described embodiment may be applied to codebook-based transmission, or may be applied to non-codebook-based transmission. In this regard, according to non-codebook-based transmission, when an SRS resource is configured, the UE may determine a precoder and a rank by using an SRI. On the other hand, according to non-codebook-based transmission, when the SRS resource is not configured, at least one of following operations may be performed:

- The SRI is read as an indication of a resource (and/or a port) of another RS (e.g., a DMRS or a PTRS) (e.g., the UE determines the precoder and the rank by using a DMRS resource index (and/or a port index),
- The base station notifies the UE of a TRI instead of the SRI, and the UE determines the precoder, and
- The base station does not notify both of the SRI and the TRI, and the UE determines both of the rank and the precoder.

(Radio Communication System)

The configuration of the radio communication system according to one embodiment of the present disclosure will be described below. This radio communication system uses one or a combination of the radio communication method according to each of the above embodiment of the present disclosure to perform communication.

Figure 5:
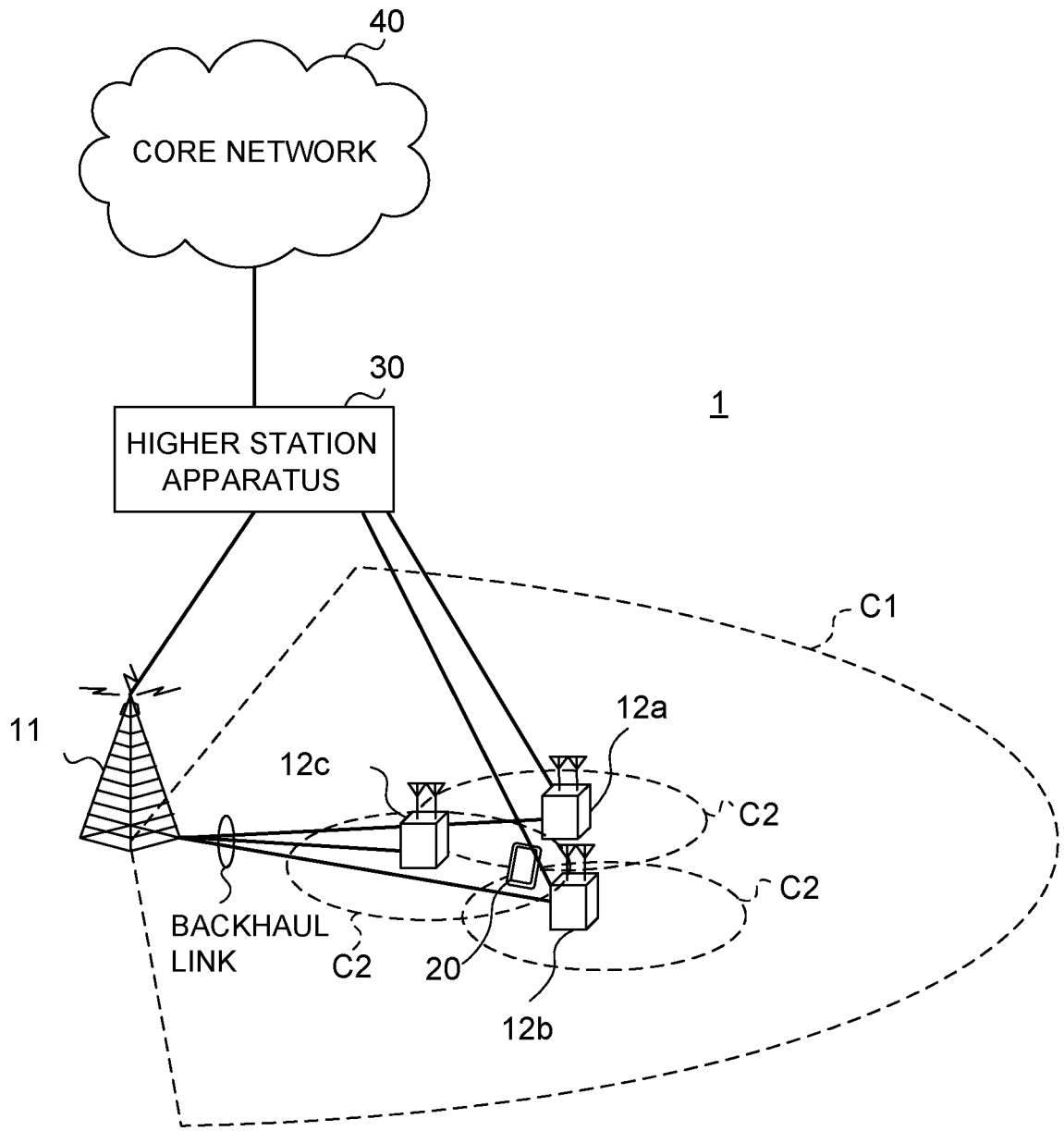
FIG. 5 is a diagram illustrating one example of a schematic configuration of a radio communication system according to one embodiment.

FIG. 5 is a diagram illustrating one example of a schematic configuration of the radio communication system according to the one embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to those illustrated in FIG. 5.

The user terminal 20 can connect with both of the radio base station 11 and the radio base stations 12. The user terminal 20 is assumed to concurrently use the macro cell C1 and the small cells C2 by using CA or DC. Furthermore, the user terminal 20 can apply CA or DC by using a plurality of cells (CCs).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

Furthermore, the user terminal 20 can perform communication by using Time Division Duplex (TDD) and/or Frequency Division Duplex (FDD) in each cell. Furthermore, each cell (carrier) may be applied a single numerology or may be applied a plurality of different numerologies.

The numerology may be a communication parameter to be applied to transmission and/or reception of a certain signal and/or channel, and may indicate at least one of, for example, a subcarrier-spacing, a bandwidth, a symbol length, a cyclic prefix length, a subframe length, a TTI length, the number of symbols per TTI, a radio frame configuration, filtering processing and windowing processing.

The radio base station 11 and each radio base station 12 (or the two radio base stations 12) may be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmitting/receiving point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmitting/receiving point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and applies Single Carrier-Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are conveyed on the PDSCH. Furthermore, Master Information Blocks (MIBs) are conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is conveyed on the PDCCH.

In addition, the scheduling information may be notified by the DCI. For example, DCI for scheduling DL data reception may be referred to as a DL assignment, and DCI for scheduling UL data transmission may be referred to as a UL grant.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific Reference Signal). Furthermore, a reference signal to be conveyed is not limited to these.

(Radio Base Station)

Figure 6:
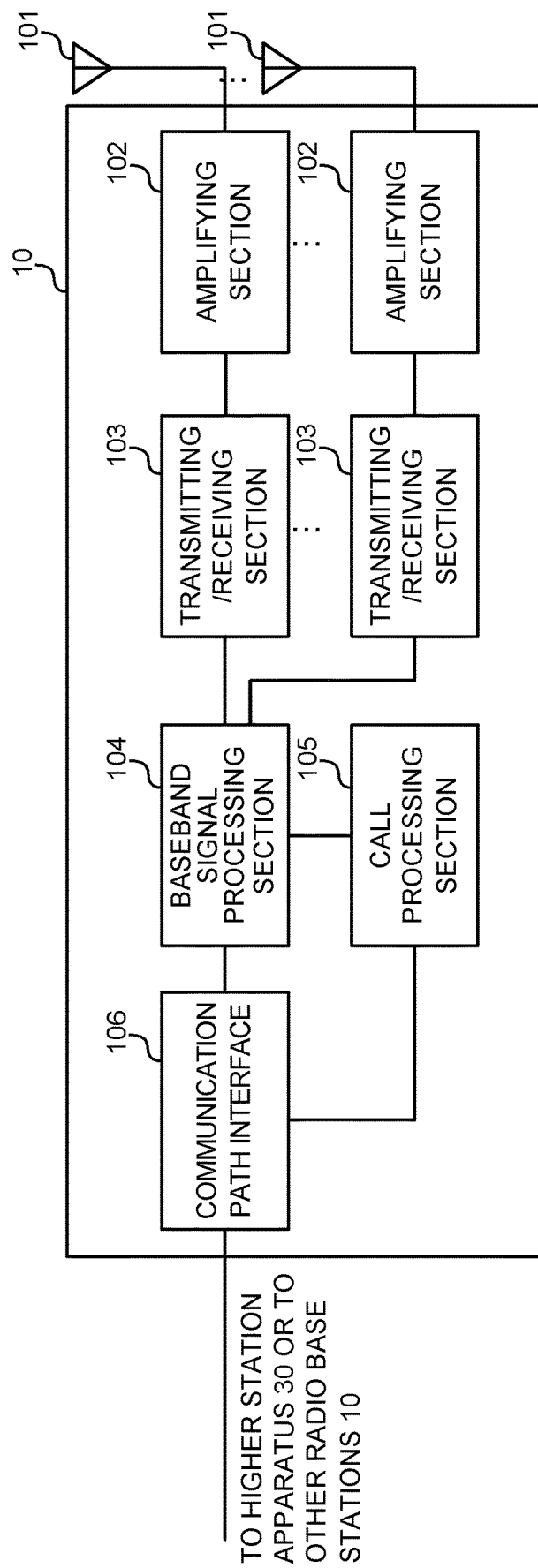
FIG. 6 is a diagram illustrating one example of an overall configuration of a radio base station according to the one embodiment.

FIG. 6 is a diagram illustrating one example of an overall configuration of the radio base station according to the one embodiment. The radio base station 10 includes pluralities of transmitting/receiving antennas 101, amplifying sections 102 and transmitting/receiving sections 103, a baseband signal processing section 104, a call processing section 105 and a communication path interface 106. In this regard, the radio base station 10 only needs to be configured to include one or more of each of the transmitting/receiving antennas 101, the amplifying sections 102 and the transmitting/receiving sections 103.

User data transmitted from the radio base station 10 to the user terminal 20 on downlink is input from the higher station apparatus 30 to the baseband signal processing section 104 via the communication path interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmitting/receiving antenna 101. The transmitting/receiving sections 103 can be composed of transmitters/receivers, transmitting/receiving circuits or transmitting/receiving apparatuses described based on a common knowledge in a technical field according to the present disclosure. In this regard, the transmitting/receiving sections 103 may be composed as an integrated transmitting/receiving section or may be composed of transmitting sections and receiving sections.

Meanwhile, each amplifying section 102 amplifies a radio frequency signal received by each transmitting/receiving antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the communication path interface 106. The call processing section 105 performs call processing (such as configuration and release) of a communication channel, state management of the radio base station 10, and radio resource management.

The communication path interface 106 transmits and receives signals to and from the higher station apparatus 30 via a given interface. Furthermore, the communication path interface 106 may transmit and receive (backhaul signaling) signals to and from the another radio base station 10 via an inter-base station interface (e.g., optical fibers compliant with the Common Public Radio Interface (CPRI) or the X2 interface).

Each transmitting/receiving section 103 receives an uplink shared channel (PUSCH) transmitted by applying a precoder. When an SRS resource is not configured to the user terminal 20, each transmitting/receiving section 103 may receive for channel measurement a reference signal (e.g., DMRS) other than an SRS to which a given precoder (e.g., a precoder based on a diagonal matrix) has been applied.

Figure 7:
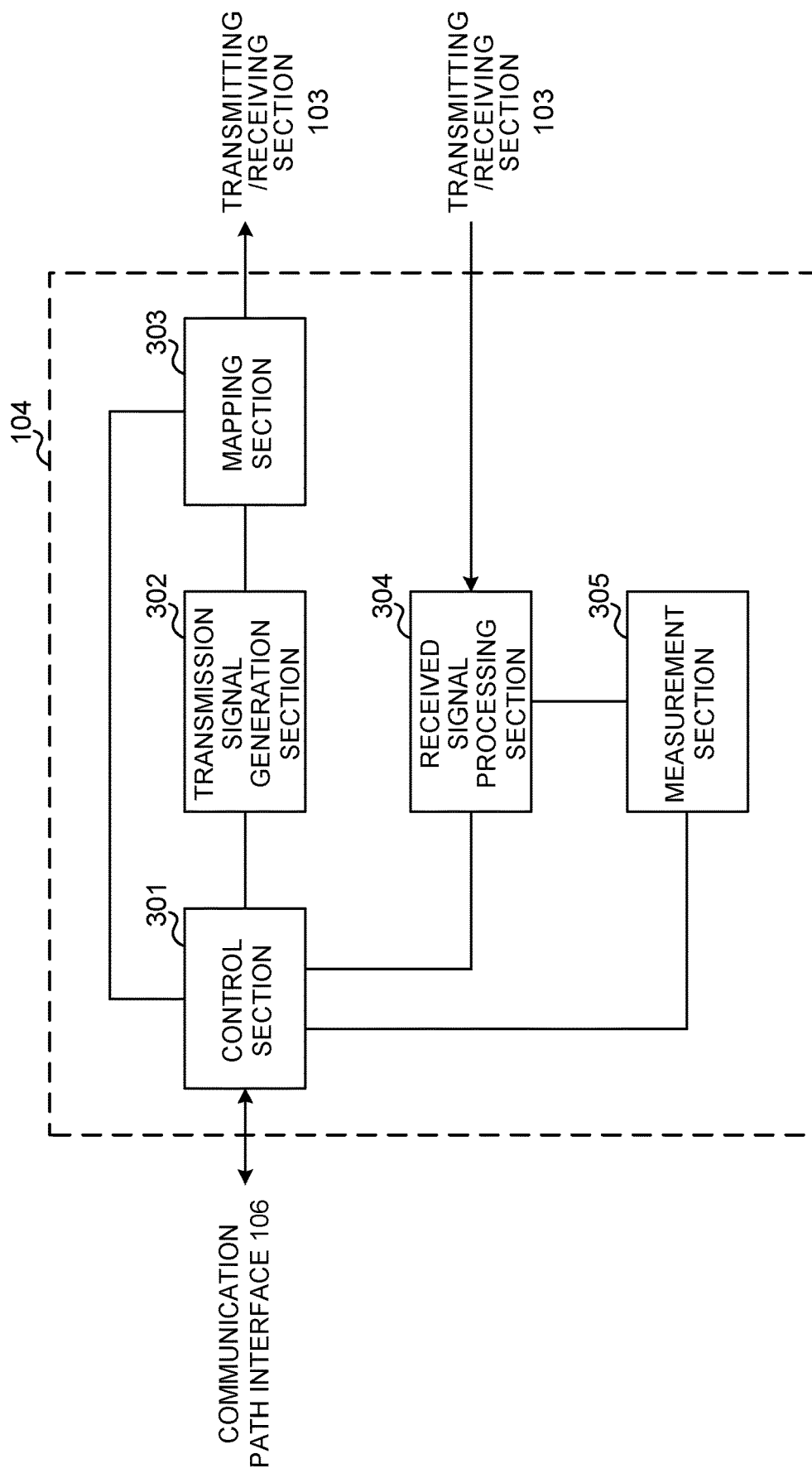
FIG. 7 is a diagram illustrating one example of a function configuration of the radio base station according to the one embodiment.

FIG. 7 is a diagram illustrating one example of a function configuration of the radio base station according to the one embodiment. In addition, this example mainly illustrates function blocks of characteristic portions according to the present embodiment, and may assume that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present disclosure.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

The control section 301 controls scheduling of an uplink data signal (e.g., a signal that is transmitted on the PUSCH), an uplink control signal (e.g., a signal that is transmitted on the PUCCH and/or the PUSCH and is, for example, transmission acknowledgement information), a random access preamble (e.g., a signal that is transmitted on the PRACH) and an uplink reference signal.

When the SRS resource is not configured to the user terminal 20, the control section 301 may specify the number of ports used to determine the precoder (and/or a codebook) to be applied to the uplink shared channel (PUSCH).

The control section 301 may decide the number of ports used to determine the precoder (and/or the codebook), based on at least one of (1) to (8) described in the above embodiment of the radio communication method.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present disclosure.

The transmission signal generating section 302 generates, for example, a DL assignment for notifying downlink data allocation information, and/or a UL grant for notifying uplink data allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on given radio resources based on the instruction from the control section 301, and outputs the downlink signal to each transmitting/receiving section 103. The mapping section 303 can be composed of a mapper, a mapping circuit or a mapping apparatus described based on the common knowledge in the technical field according to the present disclosure.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present disclosure.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present disclosure.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

(User Terminal)

Figure 8:
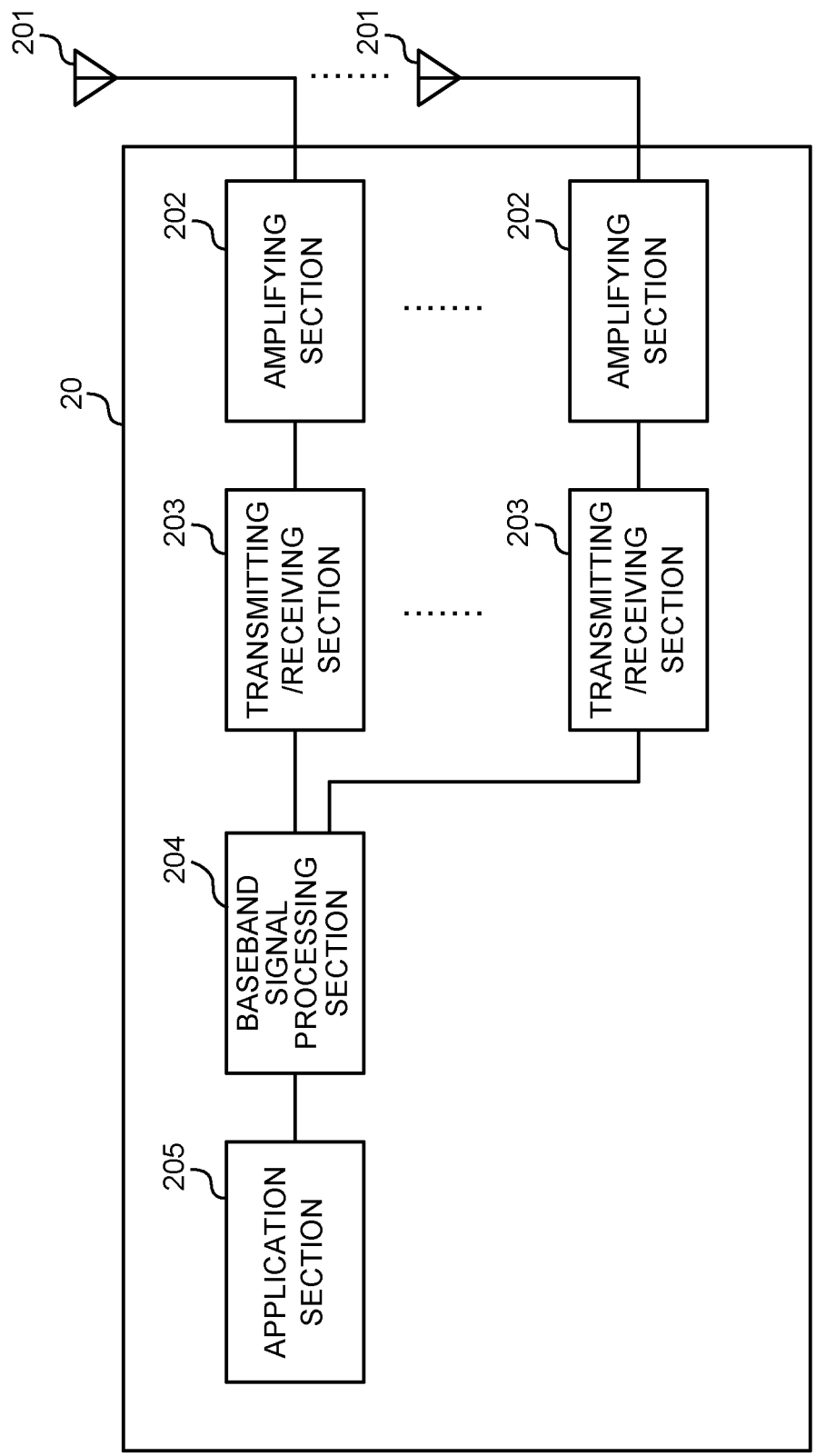
FIG. 8 is a diagram illustrating one example of an overall configuration of a user terminal according to the one embodiment.

FIG. 8 is a diagram illustrating one example of an overall configuration of the user terminal according to the one embodiment. The user terminal 20 includes pluralities of transmitting/receiving antennas 201, amplifying sections 202 and transmitting/receiving sections 203, a baseband signal processing section 204 and an application section 205. In this regard, the user terminal 20 only needs to be configured to include one or more of each of the transmitting/receiving antennas 201, the amplifying sections 202 and the transmitting/receiving sections 203.

Each amplifying section 202 amplifies a radio frequency signal received at each transmitting/receiving antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmitting/receiving circuits or transmitting/receiving apparatuses described based on the common knowledge in the technical field according to the present disclosure. In this regard, the transmitting/receiving sections 203 may be composed as an integrated transmitting/receiving section or may be composed of transmitting sections and receiving sections.

The baseband signal processing section 204 performs FFT processing, error correcting decoding, and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmitting/receiving section 203.

Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmitting/receiving antenna 201.

Each transmitting/receiving section 203 transmits an uplink shared channel (PUSCH) by applying a precoder. When an SRS resource is not configured to the user terminal 20, each transmitting/receiving section 203 may transmit for channel measurement a reference signal (e.g., DMRS) other than an SRS to which a given precoder (e.g., a precoder based on a diagonal matrix) has been applied.

Figure 9:
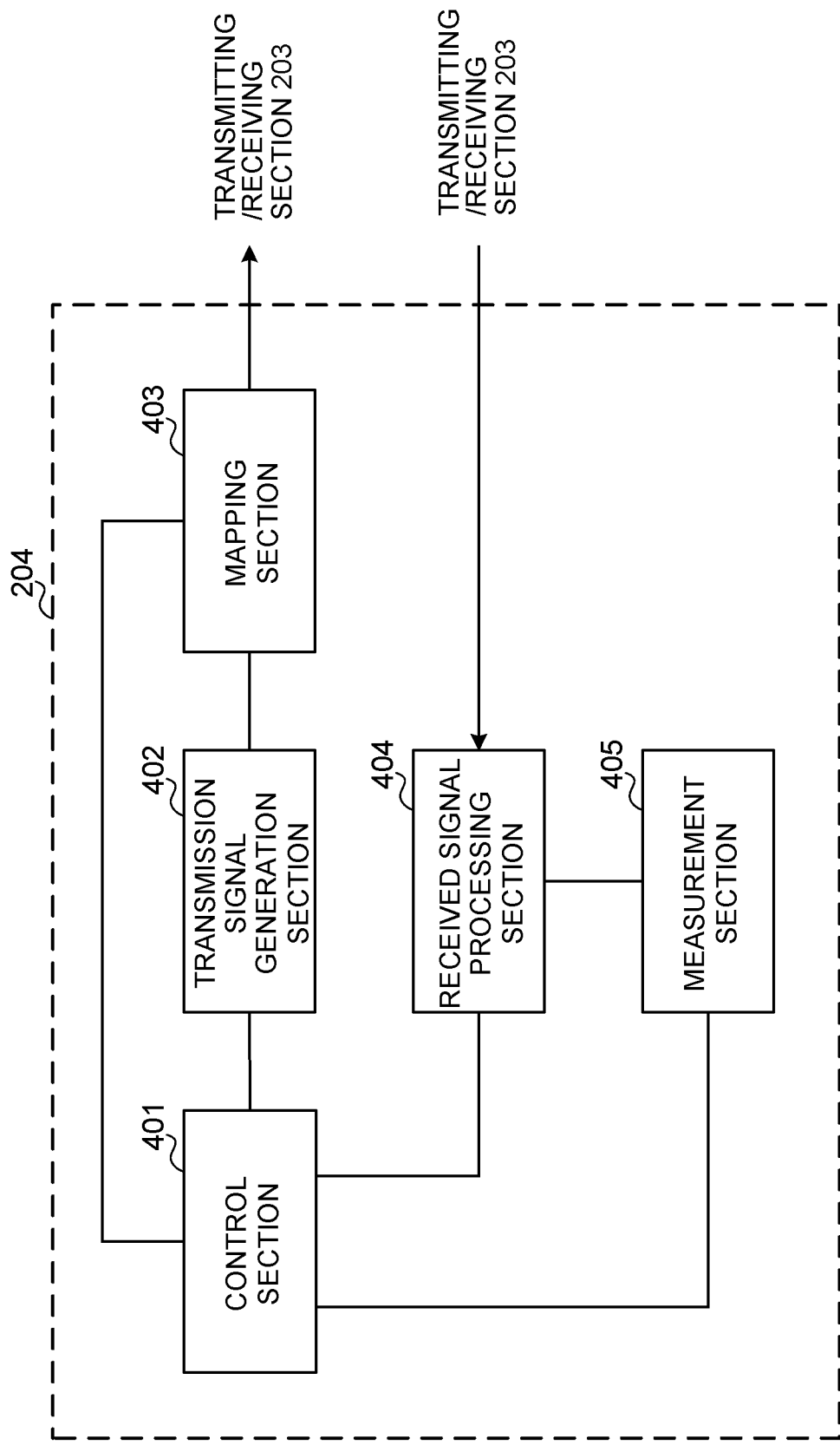
FIG. 9 is a diagram illustrating one example of a function configuration of the user terminal according to the one embodiment.

FIG. 9 is a diagram illustrating one example of a function configuration of the user terminal according to the one embodiment. In addition, this example mainly illustrates function blocks of characteristic portions according to the present embodiment, and may assume that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present disclosure.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

When the SRS resource is not configured, the control section 401 may specify the number of ports used to determine the precoder (and/or a codebook) to be applied to the uplink shared channel (PUSCH).

The control section 401 may determine the number of ports used to determine the precoder (and/or the codebook), based on at least one of (1) to (8) described in the above embodiment of the radio communication method.

For example, the control section 401 may determine the number of ports used to determine the above precoder, based on the number of DMRS ports for the uplink shared channel. The control section 401 may determine the number of ports used to determine the above precoder, based on the number of ports of the codebook indicated by a parameter (ULCodebookSubset) for determining a codebook subset.

Furthermore, when obtaining from the received signal processing section 404 various pieces of information notified from the radio base station 10, the control section 401 may update parameters used for control based on the various pieces of information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present disclosure.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmitting/receiving section 203. The mapping section 403 can be composed of a mapper, a mapping circuit or a mapping apparatus described based on the common knowledge in the technical field according to the present disclosure.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present disclosure. Furthermore, the received signal processing section 404 can compose the receiving section according to the present disclosure.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present disclosure.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

(Hardware Configuration)

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 10:
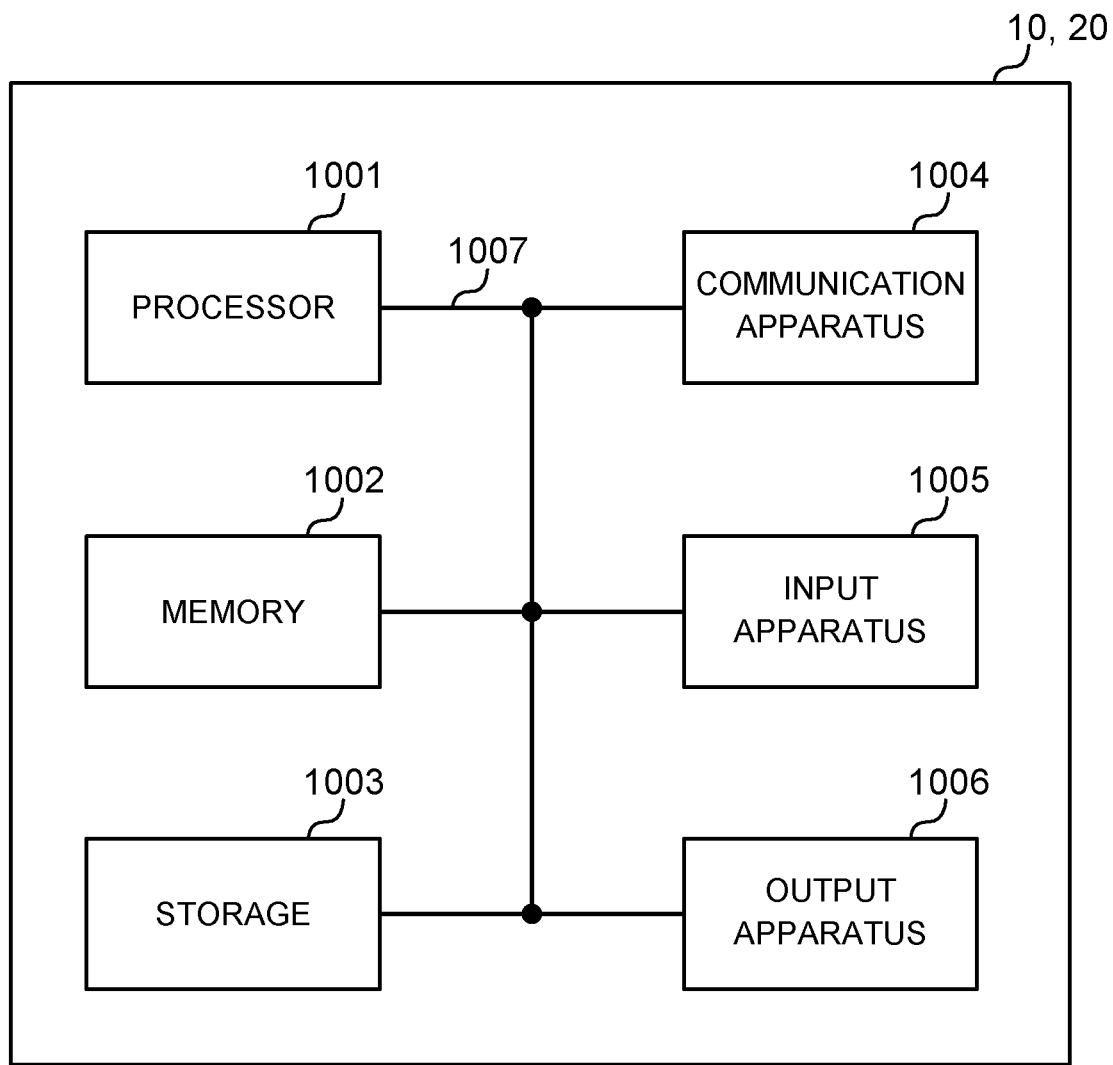
FIG. 10 is a diagram illustrating one example of hardware configurations of the radio base station and the user terminal according to the one embodiment.

For example, the radio base station and the user terminal according to the one embodiment of the present disclosure may function as computers that perform processing of the radio communication method according to the present disclosure. FIG. 10 is a diagram illustrating one example of the hardware configurations of the radio base station and the user terminal according to the one embodiment. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 10 or may be configured without including part of the apparatuses.

For example, FIG. 10 illustrates the only one processor 1001. However, there may be a plurality of processors. Furthermore, processing may be executed by 1 processor or processing may be executed by 1 or more processors concurrently or successively or by using another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and control reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above-described embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmitting/receiving device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmitting/receiving antennas 101 (201), amplifying sections 102 (202), transmitting/receiving sections 103 (203) and communication path interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a sub slot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspect/ embodiment described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (Master Information Blocks (MIBs) and System Information Blocks (SIBs)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be performed implicitly (by, for example, not notifying this given information or by notifying another information). Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Sub scriber Lines (DSLs)) and/or radio techniques (e.g., infrared rays and microwaves), these wired techniques and/or radio techniques are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station will be also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/ embodiment of the present disclosure may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of the physical and logical connections. For example, "connection" may be read as "access".

It can be understood in this description that, when connected, the two elements are "connected" or "coupled" with each other by using 1 or more electric wires, cables and/or printed electrical connection, and by using electromagnetic energy having wavelengths in radio frequency domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The invention according to the present disclosure has been described in detail above. However, it is obvious for a person skilled in the art that the invention according to the present disclosure is not limited to the embodiment described in this description. The invention according to the present disclosure can be carried out as modified and changed aspects without departing from the gist and the scope of the invention defined based on the recitation of the claims. Accordingly, the disclosure of this description is intended for exemplary explanation, and does not bring any restrictive meaning to the invention according to the present disclosure.

The invention claimed is:

1. A terminal comprising:
    a processor that determines a number of ports used to transmit a Physical Uplink Shared Channel (PUSCH) is only one based on a downlink control information scheduling the PUSCH, in response to a Sounding Reference Signal (SRS) resource not being configured by a higher layer signaling; and
    a transmitter that transmits the PUSCH,
    wherein the downlink control information does not include an SRS resource index.

2. The terminal according to claim 1, wherein the transmitter transmits the PUSCH by applying a precoder when the SRS resource is not configured by the higher layer signaling.

3. A radio communication method of a terminal comprising:
    determining a number of ports used to transmit a Physical Uplink Shared Channel (PUSCH) is only one based on a downlink control information scheduling the PUSCH, in response to a Sounding Reference Signal (SRS) resource not being configured by a higher layer signaling; and
    transmitting the PUSCH,
    wherein the downlink control information does not include an SRS resource index.

4. A base station comprising:
    a transmitter that transmits a higher layer signaling without a configuration of a Sounding Reference Signal (SRS) resource to a terminal; and
    a receiver that receives a Physical Uplink Shared Channel (PUSCH) transmitted using only one port from the terminal based on a downlink control information scheduling the PUSCH, in response to the SRS resource not being configured by the higher layer signaling,
    wherein the downlink control information does not include an SRS resource index.

5. A system comprising:
    a terminal comprising:
        a processor that determines a number of ports used to transmit a Physical Uplink Shared Channel (PUSCH) is only one based on a downlink control information scheduling the PUSCH in response to a Sounding Reference Signal (SRS) resource not being configured by a higher layer signaling;
        a transmitter of the terminal that transmits the PUSCH,
        wherein the downlink control information does not include an SRS resource index; and
    a base station comprising:
        a transmitter of the base station that transmits the higher layer signaling without a configuration of the SRS resource to the terminal; and
        a receiver that receives the PUSCH transmitted using the only one port from the terminal based on the downlink control information scheduling the PUSCH.

* * * * *